UNITED STATES PATENT OFFICE.

AKIM TKATSCH, OF LUDWIGSHAFEN, GERMANY, ASSIGNOR TO THE BADISCHE ANILIN & SODA FABRIK, OF SAME PLACE.

BROWN AZO DYE.

SPECIFICATION forming part of Letters Patent No. 671,903, dated April 9, 1901.

Application filed November 10, 1900. Serial No. 36,105. (No specimens.)

*To all whom it may concern:*

Be it known that I, AKIM TKATSCH, doctor of philosophy, a subject of the Czar of Russia, residing at Ludwigshafen-on-the-Rhine, Kingdom of Bavaria, and Empire of Germany, have invented new and useful Improvements in Azo Dyes from Nitro-Amido-Phenol Sulfo-Acid and Hydroxy-Phenyl-Glycocol Sulfo-Acid III, of which the following is a specification.

In the German Patent No. 74,111 an amido-sulfo-acid known as "amidosulfo-acid III" is described. I have discovered that if this be treated with monochlor acetic acid in the presence of sodium acetate a new hydroxy-phenyl-glycocol sulfo-acid is obtained. I call this "hydroxy-phenyl-glycocol sulfo-acid III." This constitutes a new component for the manufacture of azo dyes by combination with diazo compounds and the like. In particular I have discovered that the azo dye obtained from this new component and diazotized ortho-nitro-ortho-amido-phenol-para sulfo-acid is of value. It dyes wool chocolate-brown from the acid-bath. If the dyed goods be then treated with a chromate, the shade becomes lighter and redder and possesses a high degree of fastness against the action of milling and does not bleed onto white wool, cotton, or silk during the operation.

The following examples will serve to further illustrate the manner in which the invention can be carried into practical effect and my new coloring-matter obtained. The parts are by weight.

*Example 1—Production of the new hydroxy-phenyl-glycocol sulfo-acid III from the amido-phenol sulfo-acid III.*—Dissolve one hundred and ninety (190) parts of the aforesaid amido-phenol sulfo-acid III in one thousand (1,000) parts of water. Then dissolve ninety-five (95) parts of monochlor acetic acid in this solution and add to it three hundred and forty (340) parts of crystallized sodium acetate. Boil this mixture for about five (5) hours in a vessel fitted with an inverted condenser. Allow the temperature to fall and subsequently cool the solution thoroughly with the aid of ice. The acid sodium salt of the desired compound separates out. Collect it by filtering and press it. It is not always necessary to isolate the product in the manner described, as its solution can, if desired, be used directly for the production of azo coloring-matters.

*Example 2—Production of an azo dye from ortho-nitro-ortho-amido-phenol-para sulfo-acid and the new hydroxy-phenyl-glycocol sulfo-acid III.*—Prepare the diazo compound of the ortho-nitro-ortho-amido-phenol-para sulfo-acid in the well-known way and mix about twenty-four (24) parts thereof, contained in, say, three hundred (300) parts of water, with a solution of thirty (30) parts of the new hydroxy-phenyl-glycocol sulfo-acid III, such as can be obtained in accordance with Example 1, in about two hundred (200) parts of water containing sufficient calcined soda to maintain the mixture alkaline. Stir the solution until the combination is complete, precipitate the coloring-matter with common salt, filter, press, and dry.

The new coloring-matter thus obtained dissolves in water, giving a blue-red solution, which upon the addition of an excess of carbonate of soda turns wine-red in color. In concentrated sulfuric acid the color is orange-yellow.

Now what I claim is—

The new azo coloring-matter which can be obtained by the combination of diazotized ortho-nitro-ortho-amido-phenol-para sulfo-acid and hydroxy-phenyl-glycocol sulfo-acid III which dyes wool chocolate-brown from the acid-bath which shade becomes lighter and redder upon treatment with a chromate and which is soluble in water giving a blue-red solution which turns wine-red upon the addition of an excess of carbonate of soda and which gives an orange-yellow with concentrated sulfuric acid all substantially as described.

In testimony whereof I have hereunto set my hand in the presence of two subscribing witnesses.

AKIM TKATSCH.

Witnesses:
ERNEST F. EHRHARDT,
JACOB ADRIAN.